US012579909B2

(12) United States Patent (10) Patent No.: US 12,579,909 B2
Kwon (45) Date of Patent: Mar. 17, 2026

(54) FILM FOR WRAPPING AND MANUFACTURING METHOD THEREOF

(71) Applicant: KOREA ELECTRONICS TECHNOLOGY INSTITUTE, Seongnam-si (KR)

(72) Inventor: Soon Hyung Kwon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/545,280

(22) Filed: Dec. 19, 2023

(65) Prior Publication Data

US 2024/0249647 A1 Jul. 25, 2024

(30) Foreign Application Priority Data

Jan. 20, 2023 (KR) ........................ 10-2023-0008986

(51) Int. Cl.
| | |
|---|---|
| *G09F 3/00* | (2006.01) |
| *G02F 1/167* | (2019.01) |
| *G02F 1/16757* | (2019.01) |
| *G09F 3/02* | (2006.01) |

(52) U.S. Cl.
CPC ............ *G09F 3/0294* (2013.01); *G02F 1/167* (2013.01); *G02F 1/16757* (2019.01); *G09F 2003/0257* (2013.01); *G09F 2003/028* (2013.01)

(58) Field of Classification Search
CPC .. G09F 3/0294; G09F 3/00; G09F 2003/0257; G09F 3/02; G09F 2003/028; G02F 1/16757; G02F 1/167; C08J 5/18; C08K 9/10

USPC ...... 283/67, 70, 72, 74, 83, 85, 94, 98, 101, 283/107, 109, 110, 901; 359/295, 296
See application file for complete search history.

(56) References Cited

U.S. PATENT DOCUMENTS

2003/0058521 A1* 3/2003 Kawai ................. G02F 1/16757
359/296
2020/0086657 A1* 3/2020 Harada ................. B32B 27/302

FOREIGN PATENT DOCUMENTS

| JP | 2001-83021 A | 3/2001 |
|---|---|---|
| JP | 4559745 B2 | 10/2010 |
| JP | 2011-242801 A | 12/2011 |
| KR | 10-2009-0028645 A | 3/2009 |
| KR | 10-2020-0039154 A | 4/2020 |

OTHER PUBLICATIONS

Korean Office Action issued on Mar. 7, 2025, in corresponding Korean Patent Application No. 10-2023-0008986. (8pages in English, 7pages in Korean).

* cited by examiner

*Primary Examiner* — Justin V Lewis
(74) *Attorney, Agent, or Firm* — NSIP Law

(57) ABSTRACT

A film for wrapping including a heat shrinkable film shrinkable when the heat shrinkable film reaches a predetermined temperature, and a capsule layer formed at one surface of the heat shrinkable film while including a plurality of microcapsules is disclosed. Electrophoretic particles are included in the microcapsules. Accordingly, a color or text represented at the film for wrapping is variable.

15 Claims, 6 Drawing Sheets

FILM FOR WRAPPING AND MANUFACTURING METHOD THEREOF

CROSS REFERENCE TO RELATED APPLICATION

This patent document claims the priority and benefits of Korean Patent Application No. 10-2023-0008986, filed Jan. 20, 2023, the entire contents of which are incorporated herein by reference for all purposes.

TECHNICAL FIELD

The present disclosure relates to a film for wrapping and a manufacturing method thereof.

BACKGROUND

Films made of a synthetic resin are used for labels, wrapping sheets, etc. of beverage bottles. Films used for labels may be heat shrinkable films. A name of a product or a figure may be printed on a heat shrinkable film, and the resultant heat shrinkable film may be thermally shrunk by heat applied thereto after being attached to a periphery of a bottle. Thus, the shrinkable film may be tightly attached to an outer surface of the bottle. Such heat shrinkable films have a drawback in that, once details are printed thereon, it is impossible to vary the printed details. Furthermore, it is impossible to vary colors or text of the printed details.

Meanwhile, there are services for wrapping a film having a color on a surface of an interior or exterior of a vehicle. In accordance with such services, the vehicle is decorated through wrapping of a film having a color different from a painted color of the vehicle. The film for vehicle wrapping may have a single color or may be a product printed with a figure or text. Even such a vehicle wrapping film cannot vary the color or text of details printed thereon.

SUMMARY

Therefore, the present disclosure has been made in view of the above problems, and it is an object of the present disclosure to provide a heat shrinkable film for wrapping and a manufacturing method thereof.

In accordance with an aspect of the present disclosure, the above and other objects can be accomplished by the provision of a film for wrapping including a heat shrinkable film shrinkable when the heat shrinkable film reaches a predetermined temperature, and a capsule layer formed at one surface of the heat shrinkable film while including a plurality of microcapsules.

In an embodiment, the capsule layer may include the plurality of microcapsules each including a fluid and electrophoretic particles therein, and a binder configured to fix the microcapsules to one another while fixing the microcapsules to the heat shrinkable film.

In an embodiment, the capsule layer may include the plurality of microcapsules each including quantum dots therein, and a binder configured to fix the microcapsules to one another while fixing the microcapsules to the heat shrinkable film.

In an embodiment, each of the microcapsules may be fixed in a state in which a size thereof in a shrinkage direction of the heat shrinkable film is greater than a size thereof in a thickness direction of the heat shrinkable film.

In an embodiment, each of the microcapsules may be made of a material having heat shrinkability, similarly to the heat shrinkage film.

In an embodiment, the heat shrinkage film may be made of a transparent material such that the capsule layer is observable through the heat shrinkage film.

In an embodiment, the film for wrapping may further include at least one of a first electrode layer made of a transparent material having electrical conductivity and formed between the capsule layer and the heat shrinkage film or a second electrode layer made of a material having electrical conductivity and formed under the capsule layer.

In an embodiment, the binder may further include a flexible or heat shrinkable material and a material having electrical conductivity.

In an embodiment, the film for wrapping may further include an adhesive layer made of a material having heat shrinkability and formed under the capsule layer.

In another aspect of the disclosure, there is provided a method of manufacturing a film for wrapping, including preparing a heat shrinkable film, forming, on the heat shrinkable film, a capsule layer with a microcapsule and a binder mixed therein, and fixing the capsule layer in a pressed state of the microcapsule such that a size of the microcapsule is increased in a shrinkage direction of the heat shrinkable film.

In an embodiment, the fixing the capsule layer may include pressing the microcapsules using a pressing layer configured to press the capsule layer, and removing the pressing layer after the binder is cured.

In an embodiment, the method may further include forming a first electrode layer at the heat shrinkable film before formation of the capsule layer, forming a second electrode layer at the capsule layer after fixing of the capsule layer, and coupling a second heat shrinkable film to the second electrode layer.

Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for best explanation.

BRIEF DESCRIPTION OF THE DRAWINGS

The above and other objects, features and other advantages of the present disclosure will be more clearly understood from the following detailed description taken in conjunction with the accompanying drawings, in which:

FIG. 6 is a view showing a method of manufacturing the film for wrapping in accordance with an embodiment.

DETAILED DESCRIPTION

Figure 1:
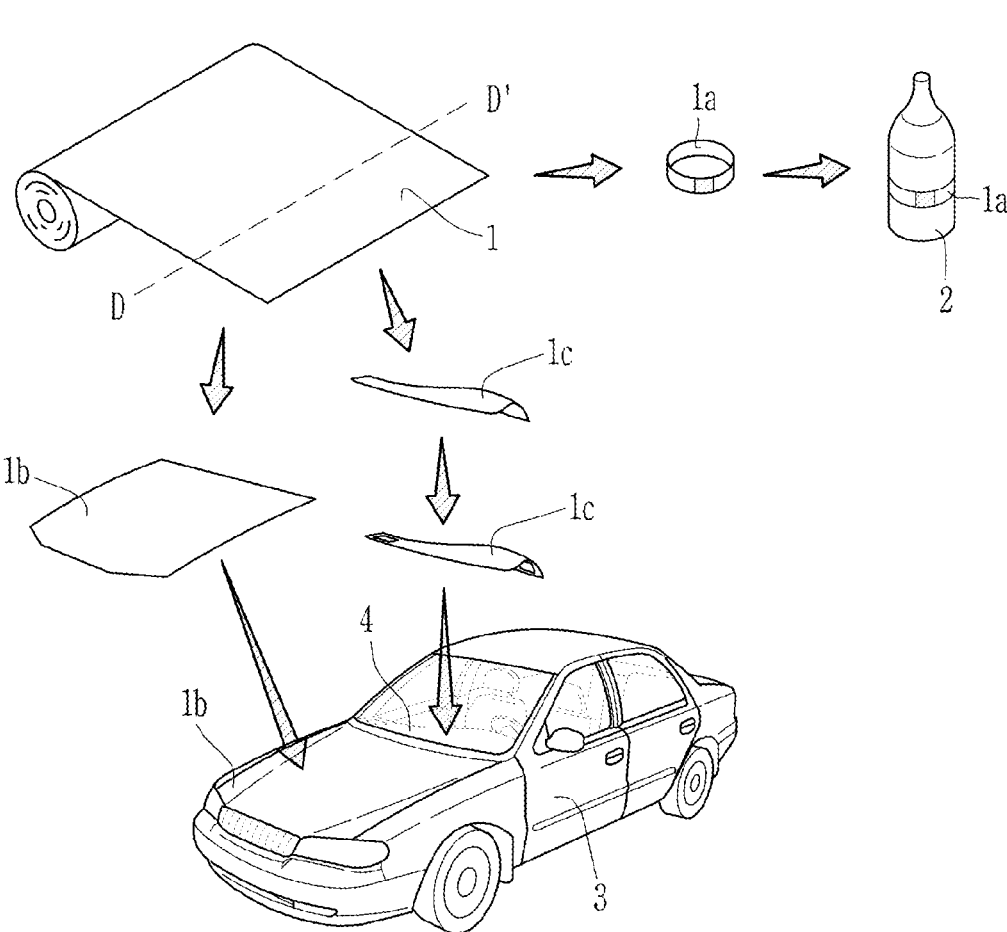
FIG. 1 is a view showing an object using a film for wrapping according to an embodiment of the present disclosure.

Objects, particular advantages and new features of the present disclosure will be more clearly understood from the following detailed description and preferred embodiments taken in conjunction with the accompanying drawings. However, the present disclosure is not limited to the embodiments. In the following description, when a detailed description of the relevant known function or configuration is determined to unnecessarily obscure the subject matter of the present disclosure, such detailed description will be omitted.

In the specification, in adding reference numerals for elements in each drawing, it should be noted that like reference numerals already used to denote like elements in one drawing are also used to denote the elements in another drawing wherever possible.

It should be noted that terms used herein are merely used to describe a specific embodiment, not to limit the present disclosure. Incidentally, unless clearly used otherwise, singular expressions include a plural meaning.

The drawings are not necessarily to scale and, in some instances, proportions may be exaggerated or schematically illustrated in order to clearly illustrate features of the embodiments.

It should be further understood that the terms "comprises", "comprising,", "has", "having", "includes" and/or "including", when used herein, specify the presence of stated features (for example, integers, functions, operations, or constituent elements such as components), but do not preclude the presence of other features.

In addition, the terms "one", "the other", "first", "second", etc. are used to differentiate one constituent element from another constituent element, and these constituent elements should not be limited by these terms.

Meanwhile, it should be understood that, when terms representing directions such as upwards, downwards, left, right, X-axis, Y-axis, Z-axis, etc. are used in the specification, these terms are merely for convenience of description, and such directions may be expressed differently from those represented by the terms, in accordance with the viewing position of an observer or the position at which an object is disposed.

It should be understood that there is no intent to limit the embodiments described in the present disclosure and the accompanying drawings to particular forms, but on the contrary, embodiments are to cover all modifications, equivalents, and alternatives falling within the spirit and scope of embodiments.

Hereinafter, exemplary embodiments of the present disclosure will be described in detail with reference to the accompanying drawings.

FIG. 1 is a view showing an object using a film 1 for wrapping (referred to hereinafter as a "wrapping film 1") according to an embodiment of the present disclosure.

The wrapping film 1 according to the embodiment of the present disclosure may have shrinkability such that the wrapping film 1 shrinks when heat is applied thereto. The wrapping film 1 may be tightly attached to a curved surface while being shrunk. The wrapping film 1 may be used to wrap an object having various curved surfaces through shrinkability thereof. The wrapping film 1 may be used in a state of being cut (along a cut line D-D') to have a desired size and a desired shape.

For example, the wrapping film 1 may be cut to have a predetermined size, and cut ends of the wrapping film 1 may then be coupled to each other such that the wrapping film 1 has a ring shape. Thus, the wrapping film 1 may be formed into a label 1*a*. The label 1*a* may be coupled to a bottle 2, to surround an outer peripheral surface of the bottle 2, and may then be thermally shrunk by heat applied thereto. Thus, the label 1*a* may be coupled to the bottle 2.

For example, the wrapping film 1 may be manufactured as an interior sheet 1*c* cut to have a desired shape, for attachment thereof to a surface of an interior of a vehicle 3. The interior sheet 1*c* formed of the wrapping film 1 may be tightly attached to an object having a complex curved surface such as a center fascia board 4 because the interior sheet 1*c* has heat shrinkability.

For example, the wrapping film 1 may be manufactured as a cover sheet 1*b* to be attached to a surface of an exterior of the vehicle 3. The cover sheet 1*b* formed of the wrapping film 1 may be tightly attached to an object having a curved surface such as a bonnet 5 because the cover sheet 1*b* has heat shrinkability.

Figure 2:
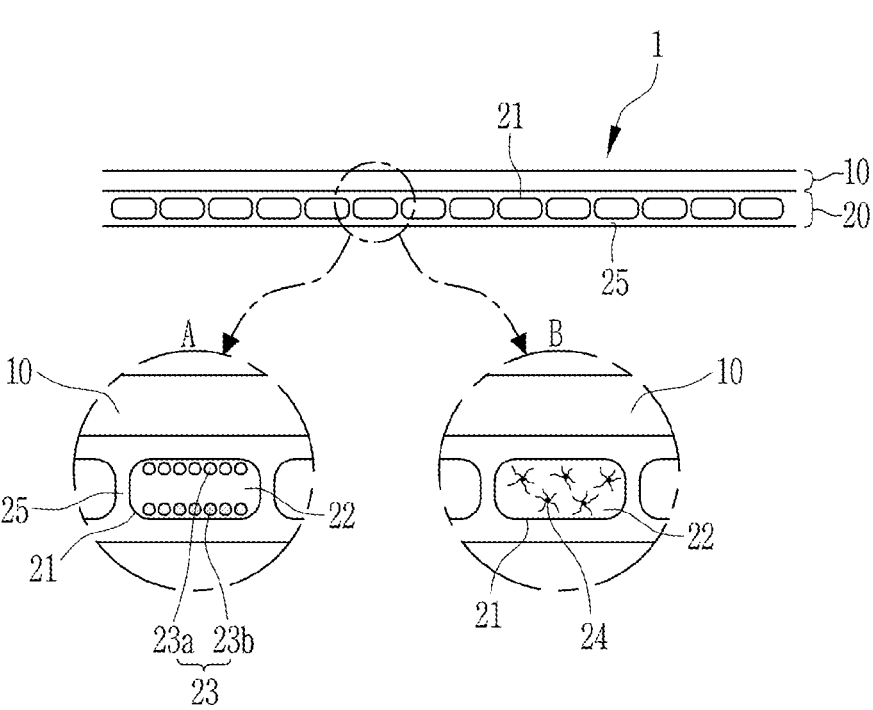
FIG. 2 is a view showing a cross-section of the film for wrapping according to an embodiment.

FIG. 2 is a view showing a cross-section of the wrapping film 1 according to an embodiment. An enlarged view A in FIG. 2 shows a microcapsule 21 including electrophoretic particles 23, and an enlarged view B in FIG. 2 shows a microcapsule 21 including quantum dots 24.

In accordance with an embodiment, the wrapping film 1 may include a heat shrinkable film 10 shrinkable when the heat shrinkable film 10 reaches a predetermined temperature, and a capsule layer 20 formed at one surface of the heat shrinkable film 10 while including a plurality of microcapsules 21. The wrapping film 1 may have a multilayer structure including one or more heat shrinkable films 10, a capsule layer 20, and a layer configured to perform other functions.

The heat shrinkable film 10 may have a property of being shrinkable in a predetermined direction when the heat shrinkable film 10 reaches a predetermined temperature. The heat shrinkable film 10 may be manufactured using a material based on polyvinyl chloride (PVC), oriented polystyrene (OPS), or polyester.

The heat shrinkable film 10 may be made of a material including one or more selected from a polyolefin-based resin such as polyethylene, polypropylene, polybutene, or the like, a poly(methyl methacrylate) ester-based resin, a polycarbonate-based resin, a polyester-based resin such as polyethylene terephthalate, polybutylene terephthalate, or the like, and a polyamide-based resin. In addition, in place of resins, polystyrene, rubber-modified high impact polystyrene (HIPS), a styrene-butyl acrylate copolymer, a styrene-acrylonitrile copolymer, a styrene-maleic anhydride copolymer, an acrylonitrile-butadiene styrene copolymer (ABS), a methacrylate butadiene styrene copolymer (MBS), a polyvinyl chloride-based resin, a phenolic resin, a urea resin, a melamine resin, an epoxy resin, an unsaturated polyester resin, a silicon resin, etc. may be used.

The capsule layer 20 may include a plurality of microcapsules 21 each including a fluid 22 and electrophoretic particles 23 therein, and a binder 25 configured to fix the microcapsules 21 to one another while fixing the microcapsules 21 to the heat shrinkable film 10. The capsule layer 20 is a layer formed at one surface of the heat shrinkable film 10. The microcapsules 21 may be arranged in the capsule layer 20 in the form of a single layer.

As described above, each microcapsule 21 may include the fluid 22 and the electrophoretic particles 23 therein. When an electric field is applied to the electrophoretic particles 23, the electrophoretic particles 23 may move in the fluid 22 in a direction of the electric field. The electrophoretic particles 23 may be charged with negative charges or positive charges. The electrophoretic particles 23 may be formed to have different charge amounts, different volumes, different shapes, different weights, etc. The electrophoretic particles 23 may have a color. The electrophoretic particles 23 may include a first electrophoretic particle 23a having a first color and a second electrophoretic particle 23b having a second color. Using the wrapping film 1 having the microcapsules 21 including the electrophoretic particles 23, it may be possible to vary a color or text displayed outwardly.

As described above, the binder 25 may fix a plurality of microcapsules 21 to one another while fixing the plurality of microcapsules 21 to the heat shrinkable film 10. The binder 25 may be made of a thermoplastic material which becomes soft when heat is applied thereto. The binder 25 may be made of a material similar to that of the heat shrinkable film 10.

As described above, the capsule layer 20 may include a plurality of microcapsules 21 each including quantum dots 24 therein, and the binder 25 configured to fix the microcapsules 21 to one another while fixing the microcapsules 21 to the heat shrinkable film 10. Each microcapsule 21 may include the quantum dots 24 therein. The quantum dots 24 may output desired light by varying a wavelength of external light input thereto.

Each microcapsule 21 may include a material capable of representing a color such as the electrophoretic particles 23 or the quantum dots 24. The microcapsule 21 may also include, therein, a material capable of performing various functions other than a color representation function.

Figure 3:
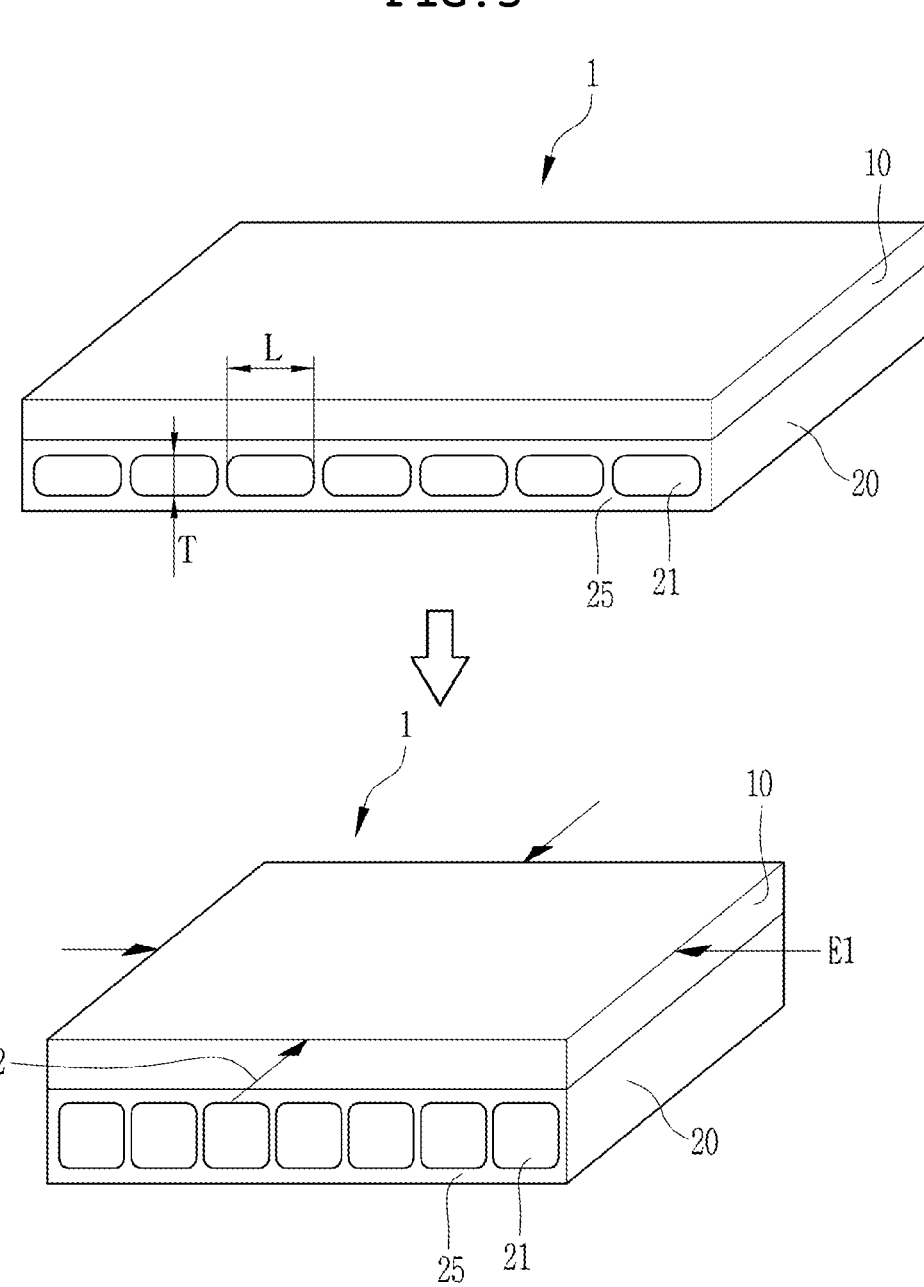
FIG. 3 is a view explaining shrinkage of a film for wrapping according to an embodiment.

FIG. 3 is a view explaining shrinkage of a wrapping film 1 according to an embodiment. An upper figure in FIG. 3 shows the wrapping film 1 before application of heat thereto, and a lower figure in FIG. 3 shows the wrapping film 1 shrunk in accordance with application of heat thereto.

When heat is applied to the wrapping film 1, the heat shrinkable film 10 shrinks, thereby causing the wrapping film 1 to be shrunk in a predetermined shrinkage direction. The heat shrinkable film 10 may have a property causing the heat shrinkable film 10 to be shrunk in a first direction E1 or in a second direction E2 perpendicular to the first direction E1. The direction in which the heat shrinkable film 10 is shrunk may be simply referred to as a "shrinkage direction".

Accordingly, the capsule layer 20 formed at the heat shrinkable film 10 may also be shrunk. When the shrinkable film 10 shrinks, the microcapsules 21 should also be shrunk because the capsule layer 20 is shrunk together with the shrinkable film 10.

In the wrapping film 1 before being thermally shrunk, each microcapsule 21 may be fixed in a state in which a size L thereof in the shrinkage direction of the heat shrinkable film 10 is greater than a size T thereof in a thickness direction of the heat shrinkable film 10. In other words, the microcapsule 21 may be fixed in a state in which the microcapsule 21 is pressed to be widened in the shrinkage direction of the heat shrinkable film 10. Here, "fixing" of the microcapsule 21 means that the microcapsule 21 is maintained in a flattened shape by the binder 25.

The microcapsule 21 may be made of a material having heat shrinkability, similarly to the heat shrinkable film 10. In addition, the microcapsule 21 may be made of a material having flexibility. Accordingly, when external heat or force is applied to the microcapsule 21, the microcapsule 21 may be physically deformed. When the binder 25 is cured, the binder 25 may fix the microcapsule 21. Accordingly, the capsule layer 20 of the wrapping film 1 before application of heat thereto may include a microcapsule 21 having a shape pressed to be flattened.

When the wrapping film 1 reaches a predetermined temperature in accordance with application of heat thereto, the heat shrinkable film 10 may be shrunk in the shrinkage direction. When the heat shrinkable film 10 shrinks, the capsule layer 20 coupled thereto may also be shrunk. At this time, the binder 25 and the microcapsule 21 may also be deformed by heat. Since the microcapsule 21 and the binder 25 are made of a material having flexibility or a material having heat shrinkability, the microcapsule 21 and the binder 25 may be simultaneously shrunk in the shrinkage direction of the heat shrinkable film 10.

In this case, since the microcapsule 21 is fixed in a state of being elongated in the shrinkage direction of the heat shrinkable film 10, the microcapsule 21 may be deformed such that the size L thereof in the shrinkage direction is decreased, and the size T thereof in the thickness direction of the heat shrinkable film 10 is increased when the heat shrinkable film 10 shrinks in the shrinkage direction. In accordance with deformation of the microcapsule 21, the binder 25 may also be deformed. Accordingly, the binder 25 may fix the microcapsules 21 to one another while still fixing the microcapsules 21 to the heat shrinkable film 10.

Hereinafter, a difference of the wrapping film according to the present disclosure from JP 4559745 B2, which is the related art literature (Patent Document 1), will be described. Patent Document 1 discloses a technology for manufacturing a display by bonding microcapsules to a heat shrinkable film under the condition that the microcapsules are spaced apart from one another, shrinking the heat shrinkable film such that the microcapsules are disposed to closely contact one another, and transferring the closely contacting microcapsules to a substrate such that the display is manufactured using the microcapsules transferred while being disposed in a closely contacting state. That is, Patent Document 1 temporarily uses the heat shrinkable film in the procedure of transferring the microcapsules, and the heat shrinkable film is not included in a final product in Patent Document 1. On the other hand, in the case of the wrapping film 1 according to the present disclosure, a structure itself in which the capsule layer 20 including the microcapsules 21 is formed at the heat shrinkable film 10 becomes a final product.

Figure 4:
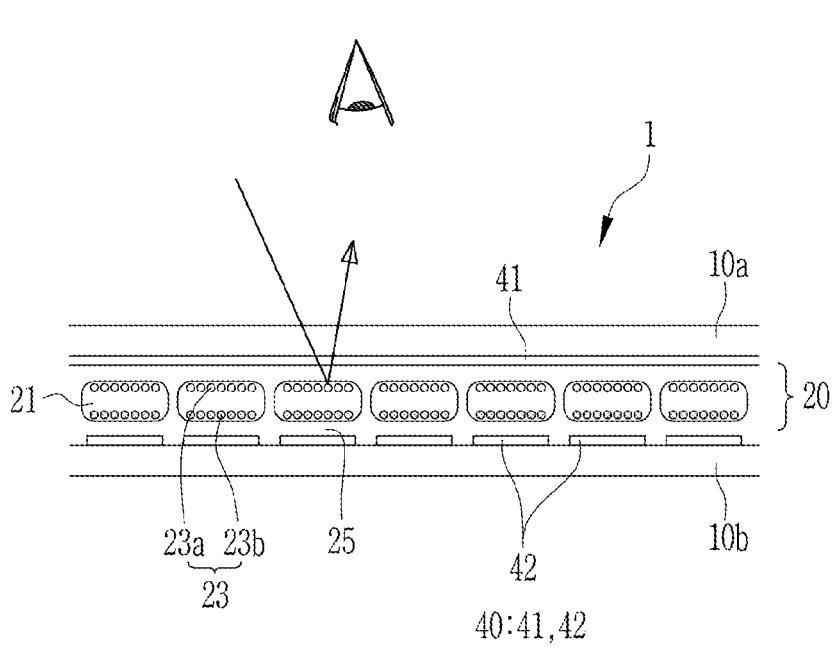
FIG. 4 is a view explaining a color-variable film for wrapping according to an embodiment.

FIG. 4 is a view explaining a color-variable wrapping film 1 according to an embodiment.

The wrapping film 1 may have a structure in which a capsule layer 20 is formed between two heat shrinkable films 10. The heat shrinkable films 10 may include a first heat shrinkable film 10 disposed at a side observable from outside, and a second heat shrinkable film 10 disposed at a side not observable from outside. The first heat shrinkable film 10 may be made of a transparent material and, as such, the capsule layer 20 may be observed through the first heat shrinkable film 10. Incident light passing through the first heat shrinkable film 10 may be reflected by electrophoretic particles 23 included in microcapsules 21 and, as such, may outwardly represent a color of the electrophoretic particles 23. As shown in FIG. 4, the color of a first electrophoretic particle 23a may be outwardly displayed.

The wrapping film 1 may further include at least one of a first electrode layer 41 made of a transparent material having electrical conductivity and formed between the capsule layer 20 and the first heat shrinkable film 10 or a second electrode layer 42 made of a material having electrical conductivity and formed under the capsule layer 20. Both the first electrode layer 41 and the second electrode layer 42 are electrode layers 40 configured to generate an electric field, respectively. Each electrode layer 40 may be divided into a plurality of electrodes respectively functioning as pixels or may be formed as a single continuous electrode. In FIG. 4, the first electrode layer 41 is shown as being formed into a single continuous electrode, and the second electrode layer 42 is shown as a structure divided into a plurality of electrodes respectively functioning as pixels. One or both of the first electrode layer 41 and the second electrode 42 may be formed to include a plurality of electrodes or may be formed to include a single continuous electrode.

The wrapping film 1 may include only the first electrode layer 41, may include only the second electrode layer 42, or may include both the first electrode layer 41 and the second electrode layer 42. In all of the above-described cases, the electrode layer 40 formed at the outwardly-observed side may be made of a transparent material. Even in the case including only the first electrode layer 41 or the second electrode layer 42, it may be possible to generate an electric field in a particular direction. Even in this case, the electrophoretic particles 23 may be moved by the electric field. Accordingly, it may be possible to vary a color or text even in a structure including only one electrode layer 40.

When the heat shrinkable film 10 shrinks, the electrode layer 40 may be shrunk together with the heat shrinkable film 10. The electrode layer 40 may be made of copper (Cu), aluminum (Al), silver (Ag), an alloy thereof, a synthetic resin having electrical conductivity, or the like and, as such, may generate an electrical field even when the electrode layer 40 shrinks in accordance with shrinkage of the heat shrinkable film 10. When the electrode layer 40 is stretched, physical cracks may be formed at the electrode layer 40, thereby resulting in a possibility of electrical disconnection. Conversely, when the electrode layer 40 shrinks, the possibility of electrical disconnection caused by physical cracks is low.

When the wrapping film 1 includes the electrode layer 40, a binder 25, which is configured to fix the microcapsules 21 to one another while fixing the microcapsules 21 to the heat shrinkable film 10, may further include a material having electrical conductivity in addition to a flexible or heat shrinkable material. The binder 25 contacting the electrode layer 40 may include the material having electrical conductivity in a trace amount. For example, the binder 25 may include metal powder of copper (Cu), silver (Ag), or the like. The material having electrical conductivity is mixed in a trace amount in the binder 25 and, as such, the binder 25 may have an electrical resistance in a range of $10^{8}$ to $10^{15}\Omega$. When an electrically-conductive material is mixed in the binder 25, an electric field generated at the electrode layer 40 may be more effectively transmitted to the microcapsules 21. Since the electrical resistance of the binder 25 is very high, no current flows between the first electrode layer 41 and the second electrode layer 42, and the electrically-conductive material of the binder 25 may assist in transmission of an electric field. When a single continuous electrode layer 40 is formed throughout the entire surface of the wrapping film 1, voltage drop may occur. Even in such an environment, the binder 25 may transmit, to the microcapsules 21, a sufficient electric field capable of moving the electrophoretic particles 23.

Figure 5:
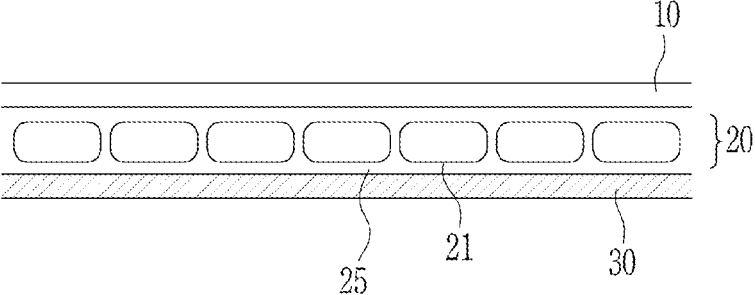
FIG. 5 is a view showing the film for wrapping further including an adhesive layer in accordance with an embodiment.

FIG. 5 is a view showing the wrapping film 1 further including an adhesive layer in accordance with an embodiment.

The wrapping film 1 may further include an adhesive layer 30 made of a heat shrinkable material and formed under the capsule layer 20. As shown in FIG. 5, the adhesive layer 30 may be formed under the capsule layer 20. The adhesive layer 30 may also be formed under the first heat shrinkable film 10 of FIG. 4. The adhesive layer 30 may be disposed at an outermost portion of the wrapping film 1, for adhesion of the wrapping film 1 to an object, or may be disposed between adjacent layers, for connection between the adjacent layers. For example, the adhesive layer 30 may be formed between the heat shrinkable film 10 and the capsule layer 20. Alternatively, the adhesive layer 30 may be formed between the electrode layer 40 and the heat shrinkable film 10.

The adhesive layer 30 may include 35 to 70% by weight of a polystyrene-based resin and 30 to 65% by weight of a polyester-based elastomer. For the adhesive layer 30, a resin mixture including a polystyrene-based resin and a polyester-based elastomer may be used. The adhesive layer 30 may be made of a material similar to that of the heat shrinkable film 10, or may partially include a material identical to that of the heat shrinkable film 10. In this case, it may be possible to prevent delamination from occurring during heat shrinkage. The polystyrene-based resin used for the adhesive layer 30 may contain an aromatic vinyl hydrocarbon-conjugated diene copolymer having excellent adhesion, and may contain a styrene-butadiene copolymer (SBS resin).

The adhesive layer 30 may be shrunk together with the heat shrinkable film 10 in a procedure in which the heat shrinkable film 10 shrinks. The adhesive layer 30 may be used in a physical adhesion manner in association with an object, to which the wrapping film 1 is applied.

Figure 6:
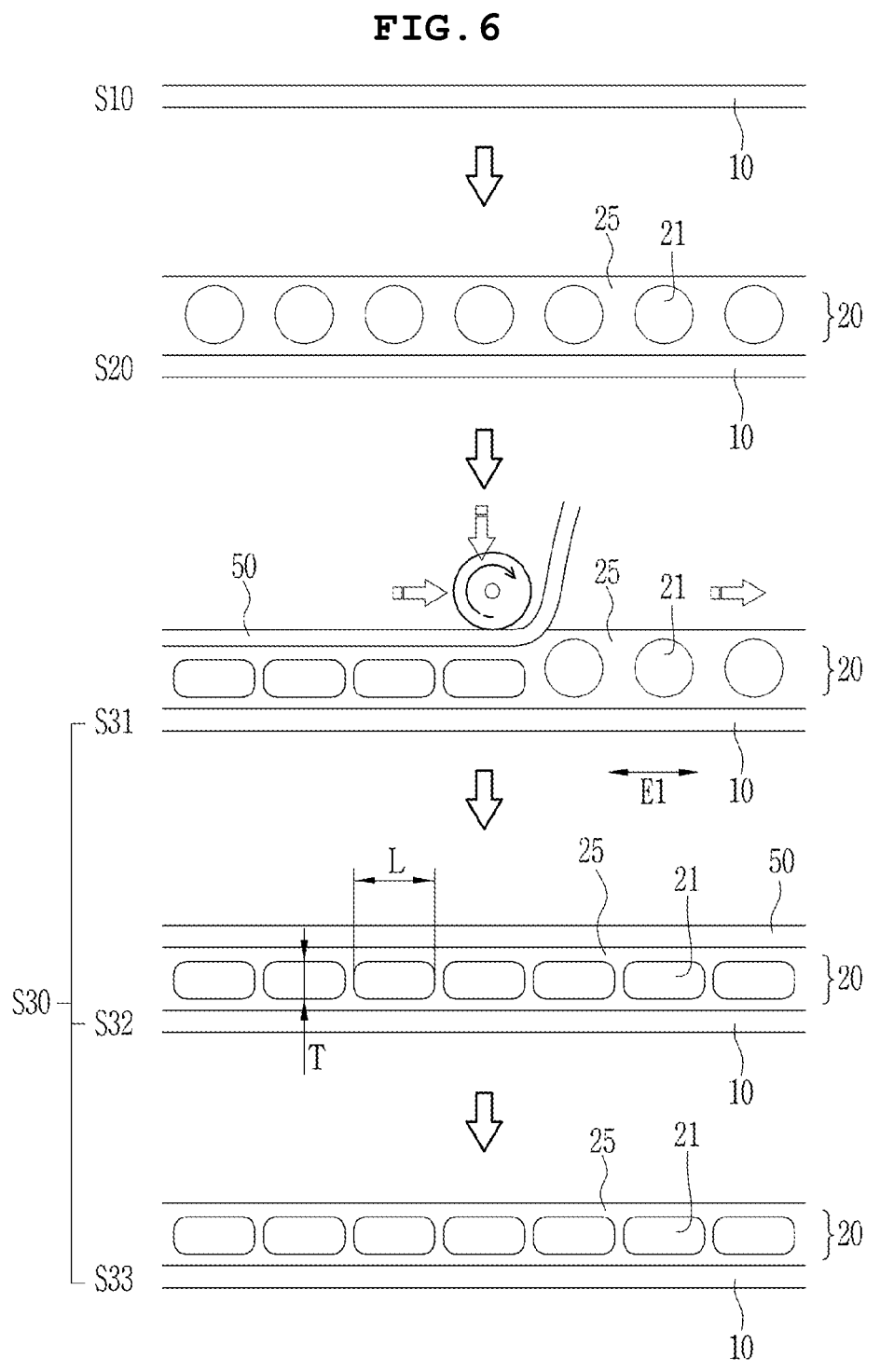

FIG. 6 is a view showing a method of manufacturing the wrapping film 1 in accordance with an embodiment.

The wrapping film manufacturing method according to the embodiment may include preparing a heat shrinkable film 10, forming, on the heat shrinkable film 10, a capsule layer 20 with a microcapsule 21 and a binder 25 mixed therein, and fixing the capsule layer 20 in a pressed state of the microcapsule 21 such that a size of the microcapsule 21 is increased in a shrinkage direction of the heat shrinkable film 10.

The preparing a heat shrinkable film 10 is a procedure of preparing a heat shrinkable film 10 shrinkable in a predetermined shrinkage direction. The heat shrinkable film 10 may be shrunk in a first direction E1 or a second direction E2.

The forming a capsule layer 20 is a procedure of mixing a plurality of microcapsules 21 and the binder 25 with each other, and forming a layer of the resultant mixture through spin coating, lamination, or the like such that the microcapsules 21 are disposed on the heat shrinkable film 10 as a single layer. When the forming the capsule layer 20 is performed, the capsule layer 20 may be formed in a state in which the microcapsules 21 are movable or deformable, because the binder 25 is in a state not cured yet.

The fixing the capsule layer 20 is a procedure of curing the binder 25 in a state in which the microcapsules 21 have been deformed in accordance with pressing thereof in a desired direction. In the fixing the capsule layer 20, the microcapsules 21 are pressed using a pressing layer 50 configured to press the capsule layer 20, and the pressing layer 50 may then be removed after the binder 25 is cured.

In the fixing the capsule layer 20, the microcapsules 21 may be pressed such that a size L of the microcapsules 21 is increased in a shrinkage direction of the heat shrinkable film 10 (for example, the first direction E1). In detail, the pressing layer 50 may sequentially press the heat shrinkable film 10 while advancing in the shrinkage direction from one side of the heat shrinkable film 10. The pressing layer 50 may be another heat shrinkable film 10. The pressing layer 50 may be pressed in a thickness direction of the heat shrinkable film 10 by a roller 60. The state in which the pressing layer 50 presses the microcapsules 21 is indicated by "S31" in FIG. 6.

When a sufficient time for curing of the binder 25 elapses in a state in which the microcapsules 21 are pressed by the pressing layer 50, the binder 25 may be cured. Curing of the binder 25 in the state of the microcapsules 21 pressed by the pressing layer 50 is indicated by "S32" in FIG. 6. The pressed state of the microcapsules 21 is a state in which the microcapsules 21 are deformed such that the size L thereof in the shrinkage direction is greater than a size T thereof in the thickness direction.

When the pressing layer 50 is removed after curing of the binder 25, the microcapsules 21 may be maintained in a pressed state. The state in which the pressing layer 50 is removed is indicated by "S33" in FIG. 6.

Figure 7:
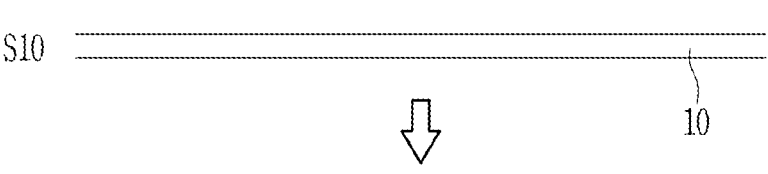
FIG. 7 is a view showing a method of manufacturing the color-variable film for wrapping in accordance with an embodiment.
Figure 7:
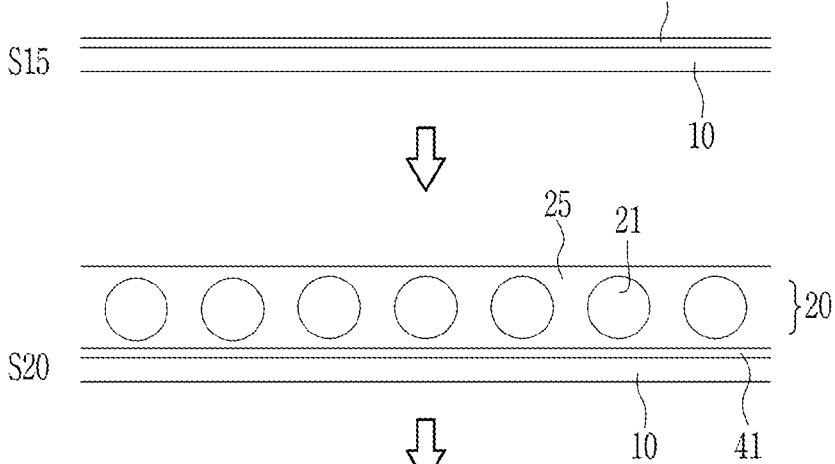
Figure 7:
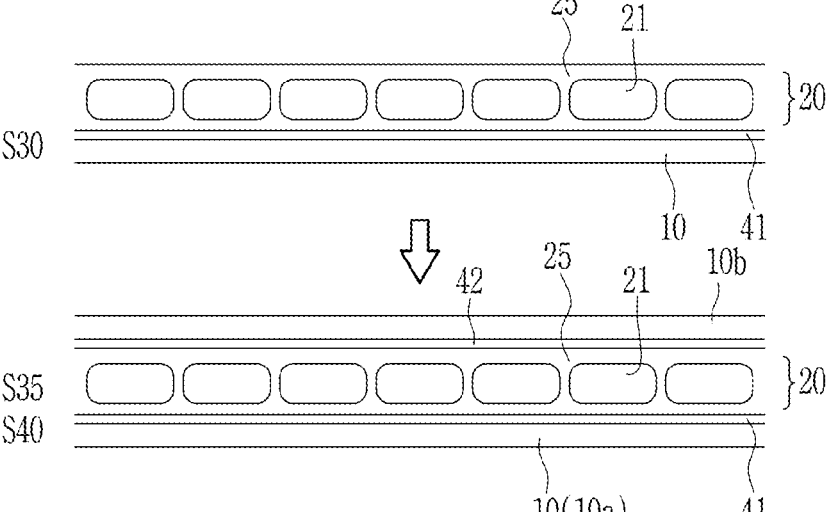

FIG. 7 is a view showing a method of manufacturing the color-variable wrapping film 1 in accordance with an embodiment.

The wrapping film manufacturing method according to the embodiment may include preparing a heat shrinkable film 10, forming a first electrode layer 41 at the heat shrinkable film 10, forming, on the heat shrinkable film 10, a capsule layer 20 with a microcapsule 21 and a binder 25 mixed therein, fixing the capsule layer 20 in a pressed state of the microcapsule 21 such that a size of the microcapsule 21 is increased in a shrinkage direction of the heat shrinkable film 10, forming a second electrode layer 42 at the capsule layer 20, and coupling a second heat shrinkable film 10 to the second electrode layer 42.

The preparing a heat shrinkable film 10 is identical to the method described with reference to FIG. 6. Of course, as the heat shrinkable film 10, a product formed of a transparent material may be prepared. In this case, the heat shrinkable film 10 may be the first heat shrinkable film 10 of FIG. 4.

The forming a first electrode layer 41 at the heat shrinkable film 10 may be performed before formation of the capsule layer 20. The first electrode layer 41 may be formed on the first heat shrinkable film 10. The first electrode layer 41 may be a single continuous electrode or may include a plurality of electrodes spaced apart from one another.

In the forming a capsule layer 20, the capsule layer 20 may be formed on the first electrode layer 41. The fixing the capsule layer 20 is identical to that of the method described with reference to FIG. 6. The forming a second electrode layer 42 at the capsule layer 20 may be performed after performing the forming the capsule layer 20, and performing the fixing the capsule layer 20.

The forming a second electrode layer 42 may be performed after performing the fixing the capsule layer 20. Similarly to the first electrode layer 41, the second electrode layer 42 may be a single continuous electrode or may include a plurality of electrodes spaced apart from one another.

After formation of the second electrode layer 42, the coupling a second heat shrinkable film 10 to the second electrode layer 42 may be performed. In the coupling the second electrode layer 42, the second heat shrinkable film 10 may be coupled to the second electrode layer 42 using an adhesive layer 30.

Alternatively, the wrapping film 1 may be manufactured in such a manner that the adhesive layer 30 is formed at the capsule layer 20 after formation of the second electrode layer 42 at the second heat shrinkable film 10, and the second electrode layer 42 is then coupled to the capsule layer 20.

In the wrapping film manufacturing method described with reference to FIG. 7, only one of the first electrode layer 41 and the second electrode layer 42 may be formed. In addition, coupling of the second heat shrinkable film 10 may be omitted.

When the above-described wrapping film manufacturing method is used, it may be possible to manufacture a wrapping film 1 capable of varying a color or text through adjustment of an electric field.

In accordance with the present disclosure, it may be possible to provide a wrapping film capable of varying a color or text and usable in a heat shrinkage manner.

In accordance with the present disclosure, it may be possible to provide a method of manufacturing a wrapping film fixed in a state in which microcapsules are pressed in a predetermined direction.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

Simple modifications and alterations fall within the scope of the disclosure, and the protection scope of the disclosure will be apparent from the appended claims.

What is claimed is:

1. A film for wrapping comprising:
   a heat shrinkable film shrinkable in a predetermined shrinkage direction when the heat shrinkable film reaches a predetermined temperature, the predetermined shrinkage direction being at least one of a first direction (E1), which is a longitudinal direction of the film, in which the heat shrinkable film contracts when heated or a second direction (E2), which is a transverse direction perpendicular to the longitudinal direction; and
   a capsule layer formed at one surface of the heat shrinkable film and the capsule layer comprising a plurality of microcapsules,
   wherein the capsule layer comprises:
   the plurality of microcapsules each including quantum dots; and
   a binder configured to fix the plurality of microcapsules to one another and fix the plurality of microcapsules to the heat shrinkable film, and
   wherein each of the plurality of microcapsules is fixed in a state in which a size of each of the plurality of microcapsules in the predetermined shrinkage direction of the heat shrinkable film is greater than a size of each of the plurality of microcapsules in a predetermined thickness direction of the heat shrinkable film.

2. The film for wrapping according to claim 1, wherein the plurality of microcapsules each includes a fluid and electrophoretic particles.

3. The film for wrapping according to claim 1, wherein each of the microcapsules is made of a material having heat shrinkability, similarly to the heat shrinkable film.

4. The film for wrapping according to claim 1, wherein the heat shrinkable film is made of a transparent material such that the capsule layer is observable through the heat shrinkable film.

5. The film for wrapping according to claim 1, further comprising at least one of:

a first electrode layer made of a transparent material having electrical conductivity and formed between the capsule layer and the heat shrinkable film; or a second electrode layer made of a material having electrical conductivity and formed under the capsule layer.

6. The film for wrapping according to claim 5, wherein the binder further comprises a flexible or heat shrinkable material and a material having electrical conductivity.

7. A film for wrapping comprising:

a heat shrinkable film shrinkable in a predetermined shrinkage direction when the heat shrinkable film reaches a predetermined temperature, the predetermined shrinkage direction being at least one of a first direction (E1), which is a longitudinal direction of the film, in which the heat shrinkable film contracts when heated or a second direction (E2), which is a transverse direction perpendicular to the longitudinal direction;

a capsule layer formed at one surface of the heat shrinkable film and comprising a plurality of microcapsules each including quantum dots; and an adhesive layer made of a material having heat shrinkability and formed under the capsule layer.

8. The film for wrapping according to claim 7, wherein the plurality of microcapsules each includes a fluid and electrophoretic particles.

9. The film for wrapping according to claim 7, wherein each of the plurality of microcapsules is made of a material having heat shrinkability, similarly to the heat shrinkable film.

10. The film for wrapping according to claim 7, wherein the heat shrinkable film is made of a transparent material such that the capsule layer is observable through the heat shrinkable film.

11. The film for wrapping according to claim 7, further comprising at least one of:

a first electrode layer made of a transparent material having electrical conductivity and formed between the capsule layer and the heat shrinkable film; or a second electrode layer made of a material having electrical conductivity and formed under the capsule layer.

12. The film for wrapping according to claim 11, wherein the binder further comprises a flexible or heat shrinkable material and a material having electrical conductivity.

13. A method of manufacturing a film for wrapping, comprising:

preparing a heat shrinkable film shrinking in a predetermined shrinkage direction, the predetermined shrinkage direction being at least one of a first direction (E1), which is a longitudinal direction of the film, in which the heat shrinkable film contracts when heated or a second direction (E2), which is a transverse direction perpendicular to the longitudinal direction;

forming, on the heat shrinkable film, a capsule layer with a plurality of microcapsules each including quantum dots and a binder mixed inside of the capsule layer; and fixing the capsule layer in a pressed state of each of the plurality of microcapsules such that a size of each of the plurality of microcapsules is increased in the predetermined shrinkage direction of the heat shrinkable film.

14. The method according to claim 13, wherein the fixing the capsule layer comprises:

pressing the plurality of microcapsules using a pressing layer configured to press the capsule layer, and removing the pressing layer after the binder is cured.

15. The method according to claim 13, further comprising:

forming a first electrode layer at the heat shrinkable film before formation of the capsule layer;

forming a second electrode layer at the capsule layer after fixing of the capsule layer; and coupling a second heat shrinkable film to the second electrode layer.

* * * * *